United States Patent Office 3,491,439
Patented Jan. 27, 1970

3,491,439
**HEATED SURFACE AND PROCESS TO MANU-
FACTURE SUCH A HEATED SURFACING**
Robert Dubois, Prully, Lausanne, Switzerland, assignor to
Colfico S.A., Sion, Switzerland
No Drawing. Filed Mar. 10, 1965, Ser. No. 438,726
Claims priority, application Switzerland, Mar. 11, 1964,
3,169/64; May 14, 1964, 6,310/64
Int. Cl. H01c 7/00
U.S. Cl. 29—611                                             6 Claims

ABSTRACT OF THE DISCLOSURE

Heated surfacing for highways or landing strips characterized by the fact that it is covered at least partly by a plate formed of a mass of synthetic resins hardened by polymerization or cross linking and having embedded therein an electrical heating body. The surfacing is made by a process which comprises placing on a support a first layer of liquid synthetic resin, placing the electrical resistance elements on this layer, covering the resistances by a second synthetic liquid resin resinous layer curable in air which is then permitted to cure or harden in air.

Heated roads and highways in which a series of pipes are located within the road bed, and in which steam or heated water circulates, have already been proposed. This kind of road has, however, never been built on a large scale, on the one hand because of the extensive work necessary and the high cost of the installation, and on the other hand, because the effect achieved is far from being economically justifiable. It is understood of course, that such a road could find only limited usefulness and that it would not be applicable, for example for highways of extensive length.

It is an object of the present invention to avoid these difficulties. The present invention, therefore, relates to a heated surfacing, particularly as a surface covering for highways or landing strips, which is characterized in that it is covered at least partly by a plate formed by a mass of synthetic resin hardened by polymerization or crosslinking, and in the inside of which an electric heating body is embedded.

The invention further relates to a process of making such a surfacing, characterized in that at first a layer of liquid synthetic resin is applied on the support, that the electrical resistance elements are placed on this resinous layer, that then these resistances are covered by a second synthetic liquid resinous layer and which is curable in air, and that then this resin is permitted to cure, or harden, in air.

In a different embodiment of the process in accordance with the invention, an adhesive material is placed at least on a portion of that support, at least over the adhesive, a heat insulating layer is placed, and that said heat inolating layer is then covered by a layer of synthetic resin; over that layer of synthetic resin a heating web formed, for example of cloth of glass fibers having incorporated therein heating elements, is placed; this web is then covered by means of a new layer of synthetic resin and finally the entire assembly of layers of resin is permitted to cure and harden.

In order to carry out this process, adhesive material is first applied to the sub-surface in a series of strips, preferably crisscrossing over each other in order to define therebetween a series of free spaces.

Over the adhesive material, one or several layers of heat insulating materials are placed. These may be of natural or synthetic material, for example of a kind which is transversely strong; the free spaces between the strips of adhesive material and the first heat insulating layer further will then constitute air pockets which will improve the thermal insulation between the sub-surface and the surfacing desired.

Thereafter, a layer of synthetic resin is flowed thereover. The synthetic resin is capable of hardening or curing by cross-linking or polymerization, and has glass fibers added. In general one may utilize a synthetic resin having two components—enamel and curing agent. Such a mass is very durable, resists impact and abrasion particularly well, and is resistant to water, diluted organic and inorganic acids and resistant to solvents. This layer of synthetic resin is thereafter covered by a web of glass, in the warp of which electric wires are incorporated, forming resistances for heating. These are then connected to an electrical energy source, preferably by means of a transformer which permits regulation of the current passing the resistances and thus of the heat to be generated.

A piece of such fabric may, for example have a length of ten to twenty meters and may be carried to the construction site as a roll, which gradually is unrolled as it is applied to the road; various such pieces may be joined end to end by any appropriate mechanical means. The electric wires may then also be interconnected. The various electrical wires embedded in the web may be spaced from each other by twenty to thirty millimeters as desired; supplied by a potential in the order of from forty to sixty volts, they permit liberation of heat between 130 to 800 calorie hours, per square meter.

According to a variation, the metallic wires may be incorporated in the fabric in the woof or in the woof as well as in the web thereof, with insulation between the points where the various wires cross.

Once the glass fiber pieces are placed, they are covered again by a new layer of synthetic resin, and then the two layers are permitted to cure. This curing may be accelerated by heating the surfacing by supplying the resistance wires with electricity. Thus, when the temperature of the assembly is left at approximately 20° C., the time for curing of a resin is in the order of 48 hours, while when the temperature is raised to 150° C., the time is reduced to ten minutes.

In general, the heating resistances are placed approximately intermediate the entire thickness of the thus manufactured surfacing.

The synthetic resin which is used in order to carry out the process is constituted as described, by a mixture of enamel and curing agent or hardener. Preferably, the enamel is constituted by mecamyl amide (versamide) and the hardener by an epoxy resin. Such a mixture has particularly advantageous mechanical and physical characteristics, which are adequate to sustain the weight which the surfaces made by carrying out the present invention, are designed to support: such a mixture has an average bending resistance of about 800 to 1100 kg./cm.$^2$, a compression strength of 700 to 900 kg./cm.$^2$ and a tensile strength of 500 to 700 kg./cm.$^2$. The electrical characteristics of the mecamyl amide epoxy are likewise particularly good: electrical strength reaches a value between 800 to 900 kv./cm. and a specific resistance of $10^{15}$ ohms cm. after eight weeks in an atmosphere of 93% relative humidity.

The mechanical characteristics of this mixture are strongly improved when glass fibers or glass fabric is added: thus, by utilizing 75% of glass fibers in such a mixture, the bending strength reaches 5000 kg./cm.$^2$, and the tensile strength 3800 kg./cm.$^2$ In order to increase the heat conductivity, it is possible to add to the resin which is utilized in carrying out a process, and in particular to the upper layer of the surfacing, with metallic particles which are good heat conductors. This addition does not decrease the electrical resistance of the synthetic resin. Thus, it is possible to take a mixture formed of two parts of versamide-epoxy, and one part of aluminum powder; the resistance will reach $10^{15}$ ohms cm. Furthermore the mixture of versamide-epoxy is particularly resistant to freezing, which has practically no effect thereon.

In another embodiment of carrying out the process according to the present invention, abrasive particles such as silicon or corundum are added to the synthetic resin. These particles which form a filler, improve particularly the adhesion conditions of vehicle tires which run on the surface.

If it is desired to utilize the surface covering for walls, it is possible that they are covered with fabric or by a layer of paint.

The price of the surfacing when carrying out the process described is increased relatively little and it is, therefore, easily possible to apply this surfacing to aircraft landing strips, to highways of substantial length, sidewalks and the like. The advantage of utilizing such a surface covering is immediately apparent, particularly in winter, because it is possible, when heating the elements, to avoid ice formation, or snow accumulation, even if the temperature is very low, as well as to eliminate wholly or partly blankets of fog over a height sufficiently great to permit traffic or vehicles to pass or to observe the landing or take-off of aircraft.

The surfacing may also be utilized on cement bridges of highways, which first become slippery by the formation of glare ice. It is also useful in the heating of industrial places, such as warehouses, factories and garages, because it has the advantage to permit heating at night when electricity is low-priced. One may also utilize the surfacing as part of heated walls in dwelling houses in order to avoid the construction of deep basements which are necessary with conventional heating plants.

The described surface covering offers a particularly good resistance to organic and inorganic acids, as well as to solvents, and it is useful in the manufacture of heating vats or vessels, or of immersion heating elements, particularly in industries dealing with chemical products.

The manufacture of the surfacing according to the invention may be made in a factory, by forming slabs or plates of convenient size, readily transportable, and which are then joined together both mechanically and electrically.

According to another embodiment of carrying out the process according to the invention, it is possible to flow the first layer of resin directly over a support, if slabs are to be made in a factory, or to flow said layer over the surface to be covered if manufacture at the site is desired.

If desired, colored pigments may be added to either the curing agent or to the enamel constituents of the synthetic resin.

I claim:
1. A process for manufacturing a surface which is adapted to be heated, which comprises coating at least part of a support with an adhesive material, applying at least one layer of heat insulating material on the adhesive material, applying at least one layer of a liquid air-hardenable synthetic resin on said heat insulating layer, laying on said resin a heating element interwoven in a glass fibre fabric, covering said element with at least one additional layer of liquid air-hardenable synthetic resin and allowing the resin to harden.

2. Process according to claim 1, wherein the hardening of the resin is accelerated by applying electric current to the heating element.

3. Process according to claim 1, wherein the adhesive material is placed on the support in a series of overlapping criss-crossing strips so as to leave a series of free spaces, such spaces constituting pockets of air between the support, the adhesive material and the insulating material, these air pockets acting as additional thermal insulation.

4. Process according to claim 1, wherein at least the synthetic resin layer covering the heating element has abrasive particles added thereto.

5. Process according to claim 1, wherein the synthetic resin is a mixture of polyamide and epoxy resins.

6. Process according to claim 5, wherein said mixture comprises about two parts of resin and one part of aluminum powder.

References Cited

UNITED STATES PATENTS

| 1,349,136 | 8/1920 | Lillard. |
| 2,522,841 | 9/1950 | Ross _____ 219—19 |
| 2,623,150 | 12/1952 | Boecher et al. ____ 219—213 X |
| 3,047,701 | 7/1962 | Frungel _____ 94—3 X |
| 3,060,303 | 10/1962 | Skoglund et al. _____ 219—549 |
| 3,069,522 | 12/1962 | Jamison _____ 219—213 X |

FOREIGN PATENTS 702,077   1/1965   Canada.

JOHN F. CAMPBELL, Primary Examiner

J. L. CLINE, Assistant Examiner

U.S. Cl. X.R.

94—3; 219—19